United States Patent
Darraillan et al.

(10) Patent No.: US 12,333,951 B2
(45) Date of Patent: Jun. 17, 2025

(54) METHOD FOR DETERMINING A FLIGHT PLAN

(71) Applicant: AIRBUS DEFENCE AND SPACE S.A.U., Madrid (ES)

(72) Inventors: Nans Darraillan, Madrid (ES); Álvaro Sanz Durán, Madrid (ES)

(73) Assignee: AIRBUS DEFENCE AND SPACE, S.A.U., Madrid (ES)

( * ) Notice: Subject to any disclaimer, the term of this patent is extended or adjusted under 35 U.S.C. 154(b) by 224 days.

(21) Appl. No.: 17/979,960

(22) Filed: Nov. 3, 2022

(65) Prior Publication Data

US 2023/0135856 A1 May 4, 2023

(30) Foreign Application Priority Data

Nov. 4, 2021 (EP) ..................................... 21382998

(51) Int. Cl.
*G08G 5/32* (2025.01)
(52) U.S. Cl.
CPC ....................... *G08G 5/32* (2025.01)
(58) Field of Classification Search
CPC .......... G08G 5/0034; G08G 5/30; G08G 5/32; G08G 5/34; G08G 5/21; G08G 5/52
See application file for complete search history.

(56) References Cited

U.S. PATENT DOCUMENTS

| | | | |
|---|---|---|---|
| 2011/0137830 A1* | 6/2011 | Ozyurt | G06N 7/06 706/46 |
| 2013/0046422 A1 | 2/2013 | Cabos | |
| 2016/0019795 A1* | 1/2016 | Chircop | G08G 5/0078 701/3 |
| 2018/0067480 A1* | 3/2018 | Ellis | G08G 5/0021 |
| 2019/0311634 A1* | 10/2019 | Lax | G08G 5/0047 |
| 2020/0193323 A1* | 6/2020 | Alesiani | G06N 20/00 |

OTHER PUBLICATIONS

Extended Search Report for EP21382998.9, dated May 4, 2022, 10 pages.

* cited by examiner

*Primary Examiner* — Keith D Bloomquist
(74) *Attorney, Agent, or Firm* — Nixon & Vanderhye P.C.

(57) ABSTRACT

A computer implemented method to generate a flight plan for a flight mission of an aircraft by calculating, based on an optimization criterion, successive states, e.g., flight way points, along the flight plan to generate a four dimensional flight route including the aircraft latitude, longitude, altitude and time, and aircraft performance constraints results.

15 Claims, 2 Drawing Sheets

METHOD FOR DETERMINING A FLIGHT PLAN

RELATED APPLICATION

This application incorporates by reference and claims priority to European Patent Application EP21382998.9, filed Nov. 4, 2021.

FIELD OF THE INVENTION

The present invention belongs to the technical field of mission planning and execution systems for aircraft. In particular, the present invention proposes a method for determining a flight plan for an aircraft mission in a mission planning system. The flight plan comprising a four dimensional route including the aircraft latitude, longitude, altitude and time, and aircraft performance constraints results.

BACKGROUND

Typically, in mission planning systems for aircraft it is required the intervention of a human operator in order to define a flight plan through a dedicated human machine interface.

This process comprises several steps as the importation of relevant databases, the definition of the flight plan details, the creation of the lateral route or the calculation of the aircraft performance and the definition of the vertical profile. All these steps are performed by a human operator, rendering optimization tasks long and iterative by nature, unable to provide high quality solution in a reasonable timeframe.

Some systems automatize some of the previous steps, however this optimization is often focused on one use case and for a particular aircraft type. Some of these systems propose the creation of the lateral route and some of them consider the vertical dimension as well, but the step of calculating the aircraft performance remains necessary in order to confirm that the calculated route complies with the aircraft performance.

A common defect of existing solutions is that the calculation of an optimized route cannot be performed straightforwardly. Either the performance calculation is performed after route optimization implying an iterative loop, or some of the process remains manual, or the mission planning system is too focused on local optimization or on solving a particular problem without considering optimization.

Mission planning systems designed for the optimization of mission plans, in particular of the flight planning routes and trajectories, do not use the same performance models as the aircraft to make their calculation. The route is elaborated with few to none performance calculation, delegating this task to further steps sometimes even to the avionics system. Consequently, this leads to the calculation of trajectories that are, in fact, impossible to fly or not complying with softer limitations.

Solving this issue requires considering the task of the operator as the optimization of a four dimensional (latitude, longitude, altitude and time) route that complies with the performance calculation as performed by the aircraft avionics in order for the aircraft to fly the trajectory as planned.

SUMMARY

Therefore, the present invention provides a method for determining a flight plan for an aircraft mission in a mission planning system providing a flight plan comprising a four dimensional route including the aircraft latitude, longitude, altitude and time, and complying with the aircraft performance constraints.

The present invention may be embodied to create an optimized flight plan for a given mission, wherein the flight plan will be flown as planned by the aircraft.

The invention may be embodied as a computer-implemented method for determining a flight plan for an aircraft mission in a mission planning system, the mission planning system comprising: a routing engine adapted to manage a set of solvers which are configured to solve different domain models in response to a routing request, and a database module comprising at least one database related to the aircraft and/or the mission context, and a performance module in communication with the database module and the routing engine, the performance module being configured to calculate aircraft performance constraints.

The invention may be embodied as a method for determining a flight plan for an aircraft mission in a mission planning system. Through the entire description, "flight plan will be understood as a plan comprising all the information required by an aircraft to perform a given flight, including at least the aircraft performance constraints that must be met and a four dimensional route including the aircraft latitude, longitude, altitude and time complying with the aircraft performance constraints. Further, "mission" will be understood as the context in which are executed one or several flight plans by one or several assets.

The mission planning system, on which the present method is carried out, comprises the following components in order to determine the optimized flight plan for an aircraft mission: a database module, a routing engine and a performance module.

Specifically, the database module comprises the databases with information related to the aircraft mission, for example the information related to the characteristics of the aircraft being considered, information related to the mission context, etc. The database module is in charge of hosting databases and providing database management functionalities to the users, in order to allow them defining the context information.

The routing engine is in charge of receiving a routing request and then transforms this request into a domain model. Further, such domain model is solved by a solver already selected by the routing engine, so that, the routing engine is also adapted to manage the corresponding solver for solving a specific domain model. It is understood that the routing engine comprises a plurality of solvers. These solvers are individual components executables on domains prepared by the routing engine. Depending on the domain characteristics several solvers are available to solve it.

Both the routing engine and database module are in communication with a performance module. This performance module is in charge to calculate aircraft performance constraints based on the database from the database module. Specifically, the performance module is called at runtime by the solver and is in charge of retrieving the appropriate data from the available performance database or performance model depending on the state of the aircraft provided by the solver, and to return the parameters required by the solver. In addition, the performance module can be used for final performance validation on a calculated route.

The computer-implemented method comprises the following steps A), B), C), D), E) and F).

A) providing to the routing engine a routing request according to an aircraft mission and information defining the context where the mission is to be performed, the routing request comprising at least an optimization criteria.

In the first step a), the routing engine receives a routing request in order to determine the corresponding flight plan. This routing request comprises information about the aircraft mission and at least an optimization criteria which is the criteria used to determine the best route for the routing request received.

Some examples for an optimization criteria are: minimal cost for a flight, minimal time of flight, minimal consumption of fuel during a flight, and maximum safety during a flight. The routing engine also receives through the routing request information defining the context where the flight mission is to be performed.

B) transforming, by the routing engine, the routing request into a domain model to be solved, the domain model comprising a cost function according to the optimization criteria.

Once the routing request is provided to the routing engine, the routing engine transforms said routing request, already received in the previous step a), into a domain model to be solved by a solver. The domain model has a cost function that depends on the optimization criteria of the routing request. For example, if the optimization criteria from the routing request is that the fuel spent should be minimum, in the best possible solution of the domain model, the cost function to be minimized must be the fuel spent along the route.

C) sending the domain model from the routing engine to a solver of the set of solvers initiating the solver.

After transforming in step b) the routing request into a domain model by the routing engine, this domain model is sent to a solver in charge and then the solver is initialized, according to step c).

D) determining, by the solver, for each state of the aircraft, wherein each aircraft state comprises at least aircraft latitude, longitude, altitude and time, from an initial state to a final state determined by the routing request, the next states of the aircraft as follows: calculating, by the performance module, aircraft performance constraints according to the state of the aircraft and other parameters from the mission context information, and sending the aircraft performance constraints to the solver, and determining, by the solver, the next states according to the aircraft performance constraints and the cost function.

The solver determines, according to step d), each state of the aircraft from an initial state to a final state in order to determine the best route of the flight plan. Each state comprises at least the aircraft latitude, longitude, altitude and time. The states from initial and final are determined by the routing request.

The performance module calculates relevant parameters for the solver according to each state of the aircraft (in relation to the performance constraints) and information from the mission context, which are returned to the solver. Making these parameters available to the solver is critical to enable optimization of trajectories with criteria related to performance, such as fuel consumption.

Moreover, it is necessary as well to optimize the route according to non-performance related criteria while ensuring performance constraints are respected, as the cost function according to the optimization criteria can be contradictory with the performance constraint (fastest route while respecting the speed limits is a good example).

Iteratively, the solver selects each next state of the aircraft according to the performance constraints calculated by the performance module and the cost function. That is, the next aircraft state is determined as the best possible next state complying with the performance constraints and the cost function.

The solver calculates a precise trajectory complying with aircraft performance hard and soft constraints, considering local environmental predictions such as wind, atmospheric pressure and temperature.

E) selecting, by the solver, the best route solution from determined next states.

The solver selects according to step e) the best possible route solution from the determined next states for the given problem under the defined set of constraints, performance and cost function.

Through the document, will be understood as a sequence of waypoints to be flown by an aircraft, these waypoints including at least latitude including the transition and turn specification at and between waypoints.

F) providing, by the routing engine, the flight plan comprising the selected route solution being a four dimensional route including the aircraft latitude, longitude, altitude and time, and aircraft performance constraints results.

Once the best solution is already selected, the routing engine provides according to step f) the flight plan with such selected route solution and the details related to the four dimensional parameters of the route as well as the aircraft performance constraints results.

Through the entire description, "route" or "four dimensional route" will be understood as a description of the path including the aircraft latitude, longitude, altitude and time in the sequence of waypoints followed by an aircraft when flying between the departure place and arrival place.

Through this document, "aircraft state" will be understood as the parameters describing the aircraft at a time t, including at least its latitude, longitude, altitude, heading, speed, and weight. In addition, the "mission context" to the aircraft state refers to the environment parameters available, such as terrain elevation and weather data.

Wherever the performance of the aircraft has a direct or indirect impact on the quality of the solution, the method from the invention allows for better, faster and safer optimization of routes and trajectories.

The present method may be embodied to provide a high quality route solution in a reasonable timeframe compared to the prior art methods. Furthermore, compared to the prior art methods, the present method provides aircraft maneuvers solutions such as climb or descend for the route search. In addition, the present method considers the purposes of any aircraft type, weather and/or navigational database for the route search.

In a particular embodiment, the performance module comprises a machine learning module trained for determining the aircraft performance constraints.

The aircraft performance constraints are calculated for each aircraft state, therefore, introducing a trained machine learning module increase the efficiency of the solver and speed up the determination of the flight plan.

In an embodiment, the machine learning module comprises neural networks in order to determine the aircraft performance constraints. The neural networks are used to build computationally efficient surrogate models that replicates the behavior of a performance module, or returns the performance parameters without having to look into a very large database.

According to an example, the machine learning module is trained on datasets straightforwardly available such as aircraft performance tables or on datasets generated by running performance models for all aircraft states of interest and extracting the kinematic limits.

The machine learning module receives as input the parameters from the aircraft state and the mission context and it outputs the performance constraints of the aircraft to the routing engine.

After training the machine learning module, the calculation of the performance constraints is fast enough to be compatible with the high number of requests of the search algorithm from the solver.

In a particular embodiment, the method further comprises before step c) selecting by the routing engine the best solver for solving the routing request depending on domain characteristics. This consists in selecting the best solving strategy for a problem according to the available history.

The selection of the best solver may be based on criteria explicitly defined on the routing request, such as maximum time to return a route. In this example of maximum time to return a route, the routing engine selects a real-time solver that returns the most optimized route according to the time available.

In addition, the selection of the best solver may be based on the context of the mission according to previous benchmarking exercises. In an example of maximum time to return a route (in real time), if the distance between origin and destination is less than 150 km, and if the aircraft is fixed-wing aircraft, a learning real time A* solver is very adapted. By contrast, if a real-time solver is not needed, for example a solver based Reinforcement Learning may be selected.

In a particular embodiment, the routing request further comprises information of: departure and arrival aircraft condition, aircraft type and configuration, path geometry rules, or any combination of them.

In a particular embodiment, the mission context information comprises one or more over: terrain and obstacle databases, weather data, aircraft performance databases, air navigation databases, environment data in which the mission is to be performed, or any combination of them, wherein the context information is comprised in the database module.

Both the routing request information and the mission context information help to optimize the determination of flight plan for an aircraft mission. In a particular embodiment, the step b) comprises generating the domain model that models the aircraft, e.g., aircraft performance, in its start state and creating the cost function according to the optimization criteria. This modeling of the aircraft is performed to initiate the domain model once the relevant databases have been imported to the routing engine. Advantageously, compared to prior art methods, this method offers a high level of customization of the desired results. Furthermore, the provision of custom weights for each optimization criteria allows for complex multi-objective optimization. In addition, the optimization criteria can be provided without information about their importance, in which case the solver returns a Pareto front of solutions (each solution optimized favoring a different criteria amongst those provided).

In a particular embodiment, the step b) further comprises a step of determining, by the routing engine, the possible aircraft states according to the aircraft type and its possible movements.

Advantageously, compared to prior art methods, this embodiment constrains the optimization with aircraft performance limits, never proposing a solution that the aircraft is not able to fly.

In a particular embodiment, step a) is performed by an application programming interface of the mission planning system. That is, the mission planning system further comprises an application programming interface that exposes all functionalities of the present system to the users, so that this application programming interface is in communication with the users and all the operations involving the user are performed through this interface. Therefore, this interface advantageously allows the users to communicate with the mission planning system. Specifically, the users provide the context information about the aircraft mission and the routing request to the mission planning system through the application programming interface.

In a particular embodiment, the performance module determines performance constrains such as kinematic constraints and fuel consumption of the aircraft, and the step d) of determining the next states by the solver is performed according to these kinematic constraints and fuel consumption. Advantageously, compared to prior art methods, it allows the consideration of soft performance constraints, such as minimizing structure stress or fuel consumption, amongst other optimization criteria.

In a particular embodiment, each solver can be a heuristic-based solution such as A* search algorithm, a reinforcement learning based solver, a generic programming solution, a particle optimization based solver, a Monte Carlo tree search algorithm or any similar solver.

The A* search algorithm is a graph search method that selects the best neighbor in each stage optimizing a cost function $f=g+h$, g being the accumulated cost from the beginning and h being the heuristic that is an optimistic evaluation of the path that remains to reach the destination.

The reinforcement learning based solver consists in an agent able to learn from its own experience trying to solve the problem, being provided rewards corresponding to its own ultimate success or failure. With appropriate learning algorithms and a sufficient number of iterations, an agent trained with reinforcement learning is able to solve the problems it has been trained on and similar ones in a limited timeframe.

The genetic programming solution is a technique of evolving solver candidates, starting from a population of unfit algorithms, to by applying operations analogous to natural genetic processes to the population of solvers. The solver candidates can be different solvers amongst those available, or one particular solver but with different hyper-parametrization. Ultimately, the solver resulting from this process is fit for this particular optimized routing task.

In particle optimization, each route solution is represented as a particle with analogous physical properties to position and speed. The particle optimization based solver iteratively improves the solutions starting from a population of candidates, using a simple mathematical formula.

The Monte Carlo tree search algorithm is a heuristic search algorithm using random sampling of the search space. It allows solving problems with a very vast or infinite search space, which can be the case for optimized routing.

In a particular embodiment, the method comprises a further step of validating the performance of the selected route solution by the performance module.

In a particular embodiment, the method further comprises a step of encoding the selected route solution by the routing engine, wherein encoding the route comprises geometry encoding and formatting.

The validations of the selected route performance and the encoding of the selected route are performed advantageously to ensure the safety of performing the present method and its results.

In a particular embodiment, the method further comprises a step of verifying the availability of the databases with respect to the user requests, and then proceeds with the method if confirmed.

In a particular embodiment, the method further comprises, after step f), returning the flight plan to the user through the application programming interface.

In a second inventive aspect, the invention provides a computer program comprising instructions which, when the program is executed by a computer, cause the computer to carry out the steps of the method of the first inventive aspect.

In a third inventive aspect, the invention provides a computer-readable storage medium comprising instructions which, when executed by a computer, cause the computer to carry out the steps of the method of the first inventive aspect.

In a fourth inventive aspect, the invention provides a mission planning system comprising means for carrying out the steps of the method of the first inventive aspect. Specifically, the means for carrying out the steps of the present method are a human machine interface including route tables and/or maps.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION

The present invention provides a method for determining a flight plan for an aircraft mission, wherein the method is computer-implemented in a mission planning system also according to the invention.

Figure 1:
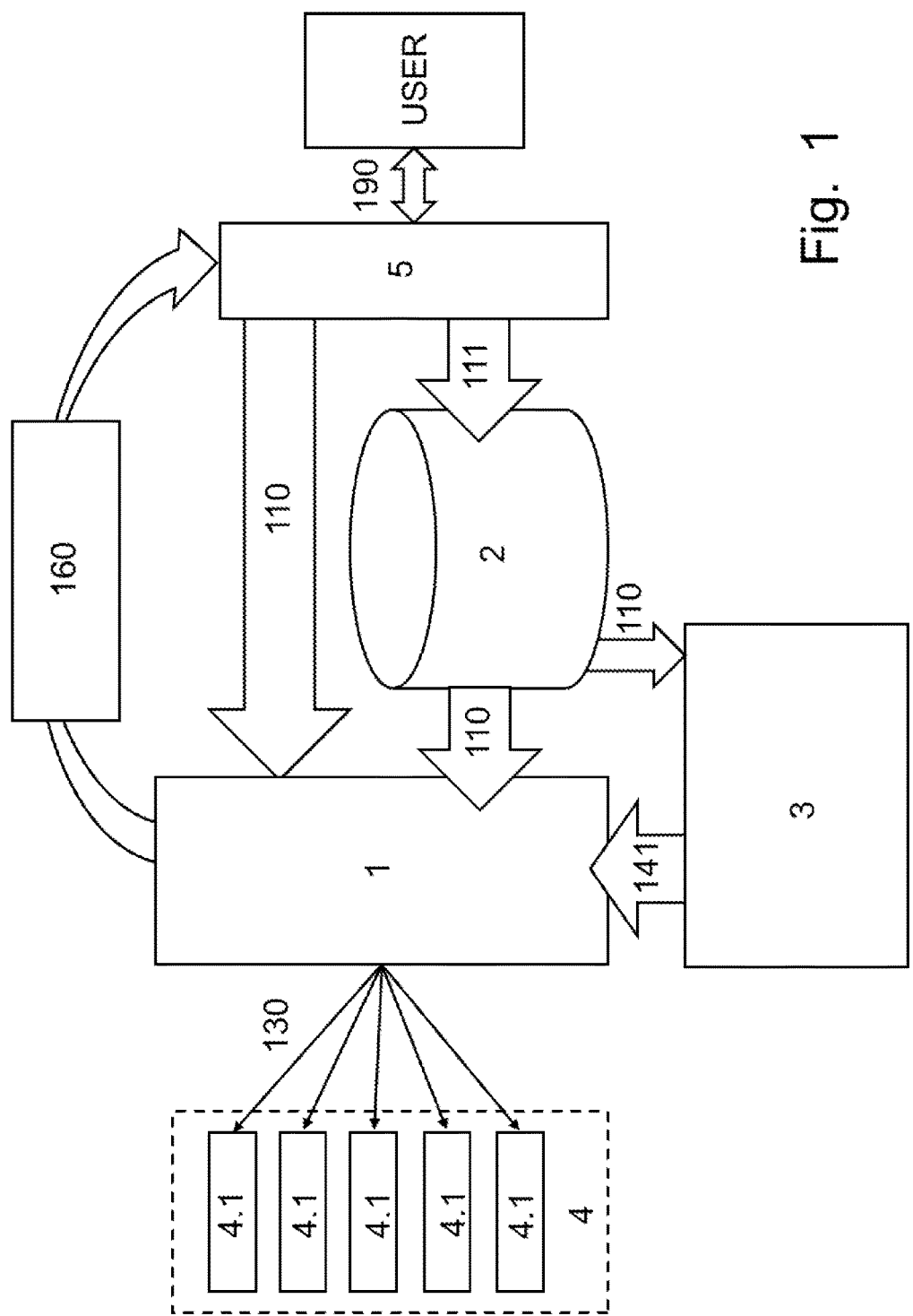
FIG. 1 shows a schematic representation of a mission planning system on which the present computer-implemented method is performed according to an embodiment of the invention.

FIG. 1 shows a schematic representation of a mission planning system according to an example of the present invention. In particular, the mission planning system comprises means for carrying out the steps of the present method (100).

The mission planning system or system shown on FIG. 1 comprises a plurality of components that interacts between them in order to determine the optimized flight plan for an aircraft mission. In particular, the system comprises a routing engine (1) comprising a set of solvers (4) configured to solve different domain models respectively in response to a routing request. The routing engine (1) manages this set of solvers (4) so that these solvers (4) are individual components executables on domains that the routing engine (1) prepares.

Depending on the domain characteristics several solvers (4) are available to solve the domain. Each domain model is solved by a solver (4.1) that is previously selected by the routing engine (1).

In particular, FIG. 1 shows a set of solver (4) comprising five available solvers (4.1) which are a particle optimization based solver (POMCP), Monte Carlo tree search algorithm (MCTS), a Cartesian genetic programming based solver (CGP), a reinforced learning based solver, and Astar search algorithm.

The system further comprises a database module (2) comprising at least a database (potentially many) with information related to the aircraft mission and the mission context. Some of this information is: terrain and obstacles, airways/corridors and health, areas to avoid, other aircraft flight plans, weather, performance configuration, communication network coverage, GPS coverage, possible threats.

The system also comprises a performance module (3) that is in data communication with the routing engine (1) and the database module (2). Specifically, the performance module (3) calculates the aircraft performance constraints based on the information stored in the database module (2). In runtime of the system, a solver (4.1) requests the performance module (3) to retrieve the appropriate data depending on the state of the aircraft provided by the solver (4.1) and to return the parameters that the solver (4.1) requires.

As shown on FIG. 1, the mission planning system further comprises an application programming interface (5) in charge of showing all the functionalities of the system to the users. In particular, this interface (5) is the means through which the users interact with the system, so that all the operations involving the users are performed through the interface (5). In addition, the user provides the context information about the aircraft mission and the routing request to the mission planning system through the application programming interface (5). Furthermore, when the method (100) determines the flight plan, this information is communicated to the user by means of the interface (5). Therefore, the interface (5) serves as a communication link between the user and the system on which the present method (100) is performed.

Figure 2:
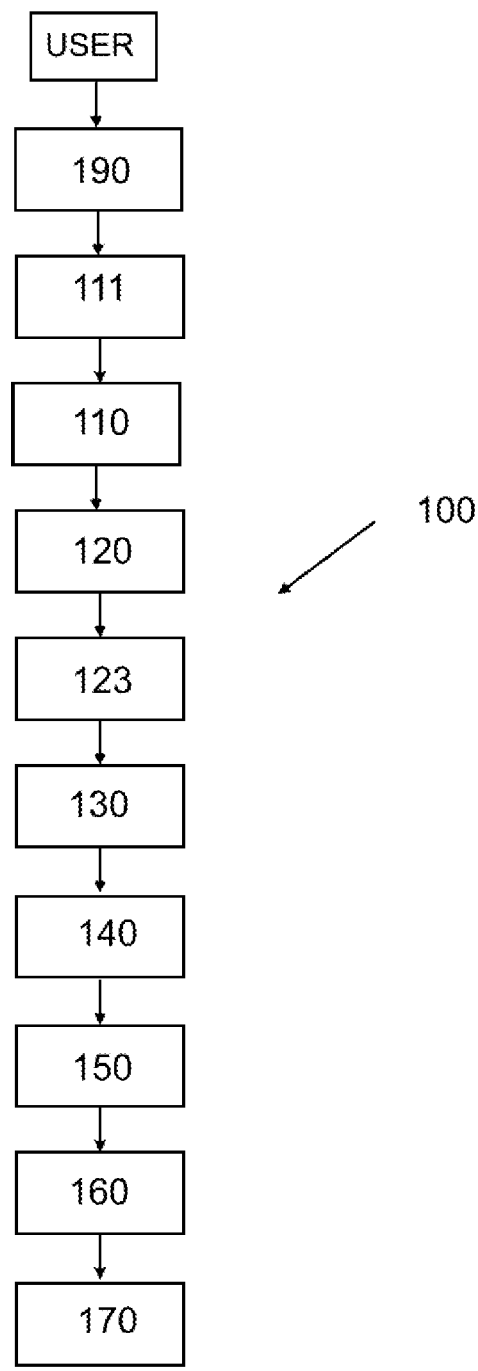
FIG. 2 shows a schematic representation of the steps of the present method according to an embodiment of the invention.

An example of the computer-implemented method (100) for determining a flight plan for an aircraft mission in the mission planning system described above is disclosed below. Particularly, a schematic representation of this example of the method (100) is shown on FIG. 2.

The computer-implemented method (100) comprises the following steps A) to F):

A) providing (110) to the routing engine (1) a routing request according to an aircraft mission and information defining the context where the mission is to be performed, the routing request comprising at least an optimization criteria.

Before step a), the user provides (190) to the mission planning system through the interface (5) all the data needed to perform the method (100). Specifically, the routing request according to an aircraft mission is provided (110) from the interface (5) to the routing engine (1). The routing request includes information related to departure and arrival condition, optimization criteria, aircraft type and configuration, path geometry and any other relevant information about the required routing.

Further, the information defining the context where the mission is to be performed is first provided (111) from the interface (5) to the database module (2) and then (110) to the routing engine (1). The context information includes terrain and obstacle databases, weather data, aircraft performance databases, air navigation databases and any other relevant data describing the environment in which the mission is to be performed.

Once all the information mentioned above is provided (110) to the system, and particularly to the routing engine (1), the method (100) verifies the availability of the databases stored in the database module (2) with respect to the user requests and then proceeds with the next step if confirmed.

B) transforming (120), by the routing engine (1), the routing request into a domain model to be solved, the domain model comprising a cost function according to the optimization criteria, Once the user provides (190) to the system the routing request, this routing request arrives to the routing engine (1) from the application programming interface (5) as an input from the user.

Next, the routing engine (1) transforms (120) the routing request into a domain model to be solved. This domain model comprises a cost function according to an optimization criteria. The cost function is created, according to the optimization criteria coming from the routing request, by modelling the aircraft in its start state. An example of the optimization criteria is that the fuel spent should be minimum, in such a way that in the best possible solution of the domain model the cost function to be minimized must be the fuel spent along the route.

In step b), the routing engine (1) also determines the possible aircraft states according to the aircraft type and its movements.

Then, the routing engine (1) selects (123) the best solver (4.1) from the set of solvers (4) (shown on FIG. 1) in order to solve the routing request coming from the user. The solving of the domain is based on the domain characteristics. That is, the routing engine (1) selects the best solving strategy for a particular problem according to the available history. This selection can either be explicit in the routing engine, following benchmarking of a series of examples for a given use case. For example, the selection may be based on knowledge beforehand that a given solver is most adapted to a given range of parameters in the request, or the selection may be based on historical information about the best selector wherein the historical information is progressively accumulated from experience. In the latter case, the routing engine maintains an internal model of the performance in terms of optimality of the solution and search time of the solvers against the request parameters. This model is progressively improved thanks to a reinforcement learning method. After a sufficient number of iterations, the routing engine is able to select the most suitable solver for the request.

C) sending (130) the domain model from the routing engine (1) to a solver (4.1) of the set of solver (4) initiating the solver (4.1).

Once a solver (4.1) is selected, then the routing engine (1) sends (130) to the selected solver (4.1) the domain model, already obtained from the routing engine (1), to initiate such solver (4.1).

D) determining (140), by the solver (4.1), a next state, e.g., waypoint along a flight path, of the aircraft, wherein each aircraft state comprises at least aircraft latitude, longitude, altitude and time. The states include an initial state to a final state, as determined by the routing request. The determining step (140) calculates each of the next states of the aircraft as follows: calculating (141), by the performance module (3), aircraft performance constraints according to the state of the aircraft and other parameters from the mission context information, and sending the aircraft performance constraints to the solver, and determining (142), by the solver (4), the next states according to the aircraft performance constraints and the cost function.

For each state of the aircraft, the selected solver (4.1) determines (140) the next state(s) of the aircraft. The states corresponds to the states from the initial state and the final state, and are determined by the routing request. Specifically, each aircraft state comprises at least aircraft latitude, longitude, altitude and time.

For determining (140) the aircraft states, first the performance module (3) calculates (141) the aircraft performance constraints according to the actual state of the aircraft and other parameters from the mission context information. An example of these performance constraints is kinematic constraints and fuel consumption of the aircraft.

In a particular example, the performance module (3) comprises a machine learning module that is trained for determining the aircraft performance constraints. For example, this machine learning module comprises neural networks to determine the aircraft performance constraints. The neural networks are used to build computationally efficient surrogate models that replicates the behavior of a performance module, or returns the performance parameters without having to look into a very large database. Specifically, the machine learning module may be trained on datasets straightforwardly available such as aircraft performance tables or on datasets which are generated by running performance models for all aircraft states of interest and extracting the kinematic limits. The machine learning module receives as input the parameters from the aircraft state and the mission context and it outputs the performance constraints of the aircraft to the routing engine (1).

Once the performance constraints of the aircraft are calculated, then the performance module (3) sends such constraints to the already selected solver (4.1).

Second, based on the aircraft performance constraints and the cost function, the selected solver (4.1) determines (142) the next state for the aircraft.

This step d) is performed iteratively for the solver (4.1) determining (140) the best possible states for the aircraft complying with the performance constraints and the already determined cost function.

Specifically, for calculating the trajectory, the solver (4.1) considers local environmental prediction such as atmospheric pressure and temperature.

E) selecting (150), by the solver (4), the best route solution from determined next states.

According to the aircraft states determined on the previous step d), the solver (4.1) selects (150) the best route solution.

F) providing (160), by the routing engine (1), the flight plan comprising the selected route solution being a four dimensional route including the aircraft latitude, longitude, altitude and time, and aircraft performance constraints results.

Finally, the routing engine (1) provides a flight plan with the route solution selected in the previous step e). In particular, the route solution provides the latitude, longitude, altitude and time of the aircraft as well as the performance constraints already calculated for the aircraft in the step d).

Moreover, the performance module (3) once the route solution is selected validates (170) the performance of said route solution. In addition, the routing engine (1) encodes the geometry of and formats the selected route solution. This validation and encode are performed for increasing the safety of performing the above method (100) and its results.

The invention may also be embodied to provide a computer program with instructions that are executed by a computer in order to perform the steps of the above method (100). Specifically, the routing engine, database module, solvers and performance modules may be computer software stored in a memory of a computer onboard an aircraft, e.g., in an electronic flight computer.

Furthermore, the invention provides a computer-readable storage medium with instructions that are executed by a computer for performing the steps of the method (100).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both, unless the application states otherwise. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A computer-implemented method configured to determine a flight plan for an aircraft mission in a mission planning system, the mission planning system including:
   a routing engine adapted to manage a set of solvers configured to solve different domain models in response to a routing request,
   a database module comprising at least one database related to an aircraft and/or a mission context associated with the aircraft mission, and
   a performance module in communication with the database module and the routing engine, wherein the performance module is configured to calculate aircraft performance constraints;
   wherein the computer-implemented method comprises:
   in a step A, providing to the routing engine a routing request according to the aircraft mission and information defining a context where the mission is to be performed, the routing request comprising at least an optimization criteria,
   in a step B, transforming, by the routing engine, the routing request into a domain model to be solved, wherein the domain model comprises a cost function according to an optimization criteria,
   in a step C, sending the domain model from the routing engine to a solver of the set of solvers to initiate the solver,
   in a step D, determining, by the solver, for each of a plurality of states of the aircraft, wherein each of the states comprises at least aircraft latitude, aircraft longitude, aircraft altitude and time, and the states include an initial state, at least one intermediate state and a final state determined by the routing request, and wherein a next of the states of the aircraft as follows:
   calculating, by the performance module, aircraft performance constraints according to the state of the aircraft and other parameters from the mission context information, and sending the aircraft performance constraints to the solver, and determining, by the solver, the next states according to the aircraft performance constraints and the cost function,
   in a step E, selecting, by the solver, the best route solution from determined next states, and
   in a step F, providing, by the routing engine, the flight plan comprising the selected route solution being a four-dimensional route including the aircraft latitude, longitude, altitude and time, and aircraft performance constraints results.

2. The computer-implemented method according to claim1, wherein the performance module comprises a machine learning module trained for determining the aircraft performance constraints.

3. The computer-implemented method according to claim 1, wherein the method further comprises before the step c) selecting by the routing engine the best solver for solving the routing request depending on domain characteristics.

4. The computer-implemented method according to claim 1, wherein the routing request further comprises information of: departure and arrival aircraft condition, aircraft type and configuration, path geometry rules, or any combination of them.

5. The computer-implemented method according to claim 1, wherein the mission context information comprises at least one of: terrain and obstacle databases, weather data, aircraft performance databases, air navigation databases, and environment data in which the mission is to be performed,
   wherein the context information is comprised in the database module.

6. The computer-implemented method according to claim 1, wherein the step b) comprises modelling the aircraft in a start state of the aircraft and creating a cost function according to the optimization criteria.

7. The computer-implemented method according to claim 1, wherein the step b) further comprises a step of determining, by the routing engine, possible aircraft states according to the aircraft type and possible movements of the aircraft.

8. The computer-implemented method according to claim 1, wherein the step a) is performed by an application programming interface of the mission planning system.

9. The computer-implemented method according to claim 8, wherein the performance module determines performance constrains including at least one of kinematic constraints and fuel consumption of the aircraft, and the step d) of determining the next states by the solver is performed according to the at least one kinematic constraints and the fuel consumption.

10. The computer-implemented method according to claim 1, wherein each solver can be a heuristic based solution including at least one of a: A* search algorithm, a reinforcement learning based solver, a genetic programming solution, a particle optimization based solver, and a Monte Carlo tree search algorithm.

11. The computer-implemented method according to claim 1, wherein the method comprises a further step of validating the performance of the selected route solution by the performance module.

12. The computer-implemented method according to claim 1, wherein the method further comprises a step of encoding the selected route solution by the routing engine, wherein encoding the route comprises geometry encoding and formatting.

13. A computer program comprising instructions which, when the program is executed by a computer, cause the computer to carry out the method of claim 1.

14. A computer-readable storage medium comprising instructions which, when executed by a computer, cause the computer to carry out the method of claim 1.

15. A mission planning system comprising means for carrying out the steps of the method of claim 1.

* * * * *